(12) United States Patent
Leib

(10) Patent No.: US 6,282,324 B1
(45) Date of Patent: Aug. 28, 2001

(54) TEXT IMAGE DEBLURRING BY HIGH-PROBABILITY WORD SELECTION

(75) Inventor: Kenneth G. Leib, Wantagh, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 900 days.

(21) Appl. No.: 08/522,112

(22) Filed: Aug. 31, 1995

(51) Int. Cl.[7] .................................................. G06K 9/40
(52) U.S. Cl. .............................................. 382/255; 382/290
(58) Field of Search ..................................... 382/171, 177, 382/182, 174, 203, 209, 216, 217, 218, 229, 230, 255, 286, 290, 292, 200, 254, 289

(56) References Cited

U.S. PATENT DOCUMENTS

| | | | |
|---|---|---|---|
| 4,251,799 | * 2/1981 | Jih | 382/174 |
| 4,275,265 | * 6/1981 | Davida et al. | 178/22.09 |
| 4,654,875 | * 3/1987 | Srihari et al. | 382/229 |
| 5,001,766 | * 3/1991 | Baird | 382/290 |
| 5,020,117 | * 5/1991 | Ooi et al. | 382/218 |
| 5,075,896 | * 12/1991 | Wilcox et al. | 382/225 |
| 5,235,653 | * 8/1993 | Nakano et al. | 382/209 |
| 5,313,527 | * 5/1994 | Guberman et al. | 382/209 |
| 5,384,863 | * 1/1995 | Huttenlocher et al. | 382/9 |
| 5,392,363 | * 2/1995 | Fujisaki et al. | 382/229 |

OTHER PUBLICATIONS

Russ, The Image Processing Handbook, 2nd Ed., 1994, pp. 199–201, Textbook.*

Stroke; Optical computing; 12/72; p. 26, p. 28; IEEE Spetrum.*

* cited by examiner

*Primary Examiner*—Timothy M. Johnson
(74) *Attorney, Agent, or Firm*—Terry J. Anderson; Karl J. Hoch, Jr.

(57) ABSTRACT

A system is presented for reconstructing blurred text on a word-by-word basis. The text is scanned and compared with a priori data concerning characteristics of the text, including zone characteristics of each letter of the alphabet. Comparisons are made between the line spacing of an image undergoing test and standard spacing. Such tests can also determine whether the image undergoing test was recorded while maintaining a tilted position. The blurred text is reconstructed on a word-by-word basis and may be displayed on a monitor. If the image undergoing test was photographed at an excessive focal length, the system is capable of detecting this and aborting analysis.

2 Claims, 8 Drawing Sheets

|  | B>S | B=S | B<S |
|---|---|---|---|
| T>S | f-df<br>f-df | f-df<br>f | f-df<br>f+df |
| T=S | f<br>f-df | f<br>f | f<br>f+df |
| T<S | f+df<br>f-df | f+df<br>f | f+df<br>f+df |

TEXT IMAGE DEBLURRING BY HIGH-PROBABILITY WORD SELECTION

RELATED CO-PENDING APPLICATION

The following co-pending application is related to the present invention: Ser. No. 08/351,707, now U.S. Pat. No. 5,642,440 by the same inventor as the present application, entitled "System Using Ergodic Ensemble for Image Restoration," and assigned to the same assignee as the present application.

FIELD OF THE INVENTION

The present invention relates to a computerized system for analyzing blurred printed text by relating the text, on a word-for-word basis, with stored characteristics of text and fonts.

BACKGROUND OF THE INVENTION

In some aspects of image recognition, access to blurred messages occurs. The need to read these occasional anomalies is obvious but present means often require time-consuming digital procedures using the various algorithms such as LaPlacian, high-pass filtering and others currently available.

One of the "standard" approaches of both optical and digital is to use an inverse filter. That is, in an optical system or its digital equivalent, one takes a Fourier Transform of the blurred image and places a filter whose character is to be determined in the Fourier or spatial frequency plane. If properly designed, the filter upon reimaging (taking another Fourier Transform) will bring a degree of restoration to the image, rendering it understandable. That means perfect restoration (in one or more operations) is not necessary, or sometimes not even possible. The basis of restoration is summarized in the following sequence of equations:

$g(x_2,y_2)$=complex amplitude of image
$h(x_1,y_1;x_2,y_2)$=impulse response
$f(x_1,y_1)$=complex amplitude of object
$g=f*h$
$G=F\ H$
$G\ H^{-1}=F\ H\ H^{-1}$
$G\ H^{-1}=F$ (Restored image)

where the capital letters refer to the Fourier Transforms of the corresponding functions and (*) denotes convolution. The result, in principle, is the inverse filter which, when inserted in the Fourier plane, should provide image restoration.

Figure 1A:
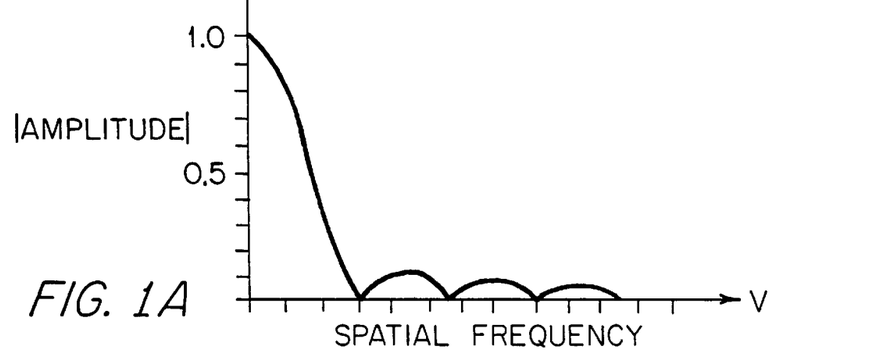
FIG. 1A is a plot of the absolute value of amplitude for an image.
Figure 1B:
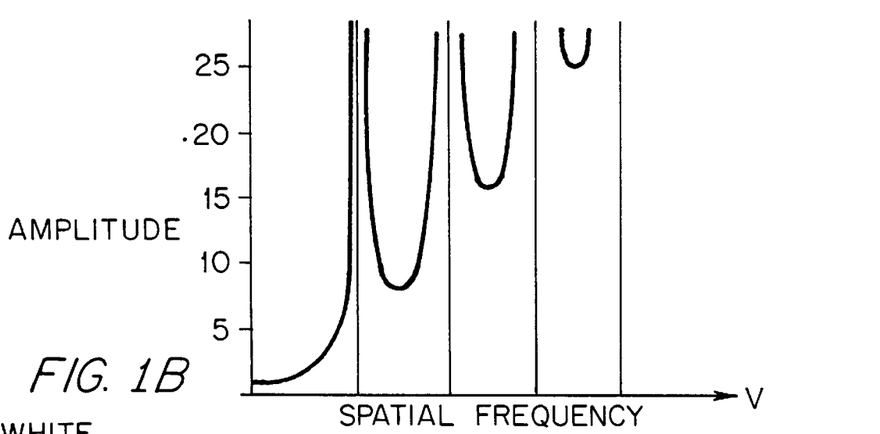
FIG. 1B is a plot of a modulus of an inverse filter corresponding to the image of FIG. 1A.

In FIGS. 1A and 1B we can see pictorially what is done. In FIG. 1A we have the absolute value of amplitude for an image with the modulus of the inverse filter shown in FIG. 1B. In the simplest case the first and third orders would have negative phase and the second and fourth, positive. In reality the spectrum amplitude and phase are much more complicated in distribution throughout the spatial frequency domain.

Much work has been and is being done principally in the digital analysis world with such techniques as contrast enhancement routines, constrained least squares filtering, extended filters, optimizing mean square error filters, and other extensions or alterations of the Wiener filter. The work also includes the standard digital fare like high-pass filtering with convolution matrices, establishing median filters wherein each pixel is processed by giving it the median of its eight neighbors (in a 3×3 matrix) and Kalman filtering with various kernels. In others, adaptive filtering is performed. This is a technique of performing a large number of iterations of, in sequence, the Fourier Transform, assessment, modification, inverse transform, assessment, Fourier Transform, modification, and so forth. A priori knowledge or good guessing drive the modifications in the sequence. In some iterative routines, the investigator assumes that the degradation must lie between or within a set of parameters and uses these to make appropriate modifications based upon this.

Although the system of my co-pending application Ser. No. 08/351,707 is capable of restoring blurred images, it is believed that the present invention directed to word processing is more efficient. This is due to the fact that larger segments generally require the use of Fourier plane processing. In this case we would process signals like:

$$(w_1+w_2+w_3\ldots)(w_1+w_2+w_3\ldots)^* = w_2^2+w_2^2\ldots+w_1w_2+w_2w_1+$$

i.e., we would have complex intraword/intrasentence terms in addition to the word and sentence terms themselves making the process of sorting amplitudes and phases of an inverse filter more demanding than most applications warrant.

BRIEF DESCRIPTION OF THE PRESENT INVENTION

This invention is a system for capturing and measuring the characteristics of blurred text imagery. Such measurements are used in conjunction with a priori information to enable blurred imagery to be interpreted with a high degree of correctness.

The a priori information is the type and point value of fonts of interest. Information about the spacing of lines is generally used. Optical information like focal length, f/#, shutter characteristics, and film characteristics are generally known. The image is captured on a high resolution CCD camera and measurements are made by scanning the image in orthogonal directions with a series of scans. The vertical scan enables one to determine the line spacing as well as the degree of keystoning, or image tilt, when recorded. Using developed information the position of the defocused image when recorded can be determined.

A horizontal scan through the lines of the imagery is used to obtain the following information:

1—word length determination
2—word length location and isolation
3—sentence identification
4—paragraph identification
5—intercolumn location
6—single upper, center, and lower letter zone identification and location, and
7—digram and trigram identification and location.

The letters of the alphabet can be divided into three groups according to whether their structure extends vertically upward or downward from a central band. Capitals all extend upward in standard and PC Multimate-like word processing fonts. Computer fonts like the "IBM" 5×7 pixel and Japanese matchstick font are a single zone set of pixels and confined to its full extent so they do not fall into the fonts to be described. The letters of interest can be divided into three zones as shown in the table below, designated upper, central, and lower. Note that the center zone is twice the upper or lower dimensionally; and in some experiments, the center had 10 scan lines through it while, of course, each of the other two then had five. It should be noted that all capitals are upper zone letters.

| | |
|---|---|
| Letters Extending to Upper Zone | b d f h i j k l t<br>A B C D E F G H I J K L M<br>N O P Q R S T U V W X Y Z |
| Letters in Central Zone | a c e m n o r s u v w x z |
| Letters Extending to Lower Zone | g j p q y |

Note that only "j" extends into the outer two zones. Thus, the detection of letter-presence in the upper and lower zones at the same position along a scan parallel to the word line immediately identifies the presence of a "j" in the word. Similarly, identification of a one-letter word as an upper zone element yields the narrow choice A or I.

In some of the frequencies of occurrence discussions, reference to the terminology "lcuu" is used to refer to the lower (1), center (c), and upper (u) zones as in the word yolk.

In addition to zone structure, the invention relies upon known frequency of letters, average paragraph size, and average word size.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 2:
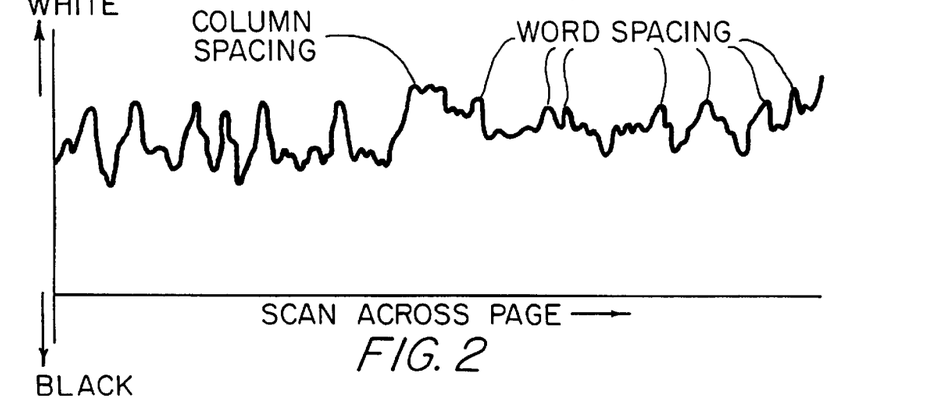
FIG. 2 is a profile illustration of a scan in which the word and column spacing can be determined.

A single scan of a typical first line of text is shown in FIG. 2 where starting from the left we can see part of the text and then the major space, column spacing, before new text begins. Since the figure shows a horizontal scan (normal to line spacing scan), we can see in this scan the word spacing points that are pointed out (black is up, white or printed down). Consequently, one can obtain a measure of the word space for each size word. Since this can be done for a wide range of defocus conditions, one can generate a curve of (f+/−del f) versus word space distance.

The text can be followed as one scans across the line and while some indication of, for example, lower zone letters is present, it can be made more pronounced as the scan goes down to and then below the center zone area. An initial description of a vertical scan is now given. In this case one scans in the y-direction to obtain data similar in nature to the horizontal or x-direction. It requires several scans to arrive at a close estimate of the line spacing because in the y-direction scans, an average must be obtained as the scan cannot be guaranteed to go through the same letter of each line so variations in the letters cause variations in measured values. This is particularly important when tilt in the image, or keystoning, is present and desired to be detected and corrected.

Figure 4:
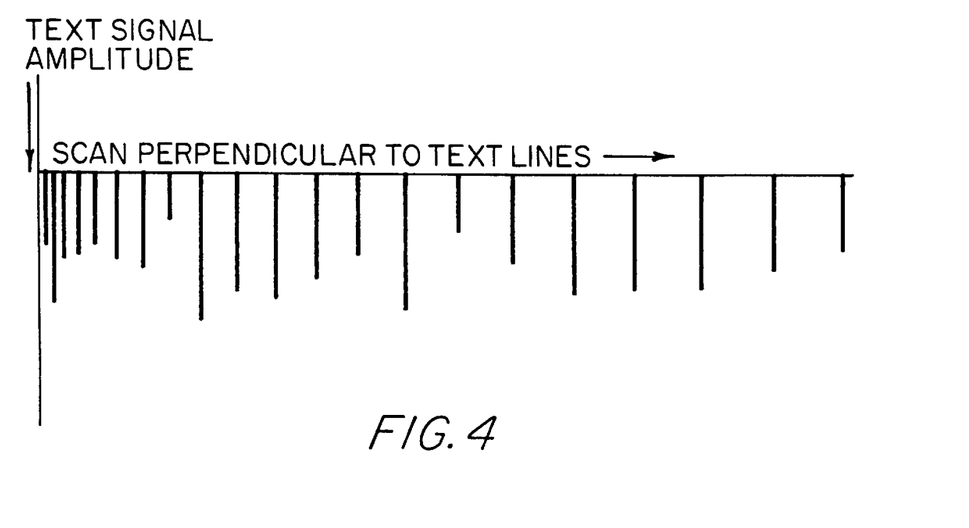
FIG. 4 is a y-direction scan at an arbitrary point on a line.

FIG. 4 illustrates a single y-direction scan obtained with the image tilted at 7°42' relating to an optical axis (Keystoning). A close examination of the line spacing will show the difference between beginning and end.

A sample of text imaged at several points along the optical axis of an imaging camera system and the line spacing was examined. The result is the experimental curve shown in FIG. 5 which is a plot of normalized focus position plotted against the normalized line spacing of the text. This is representative data which must be taken on the text which is the basis of the analysis and must be taken with the same (scaled) optical system used in analysis. Although the form of the curve is the same, local detail will depend upon the magnification of the optical system.

Figure 6:
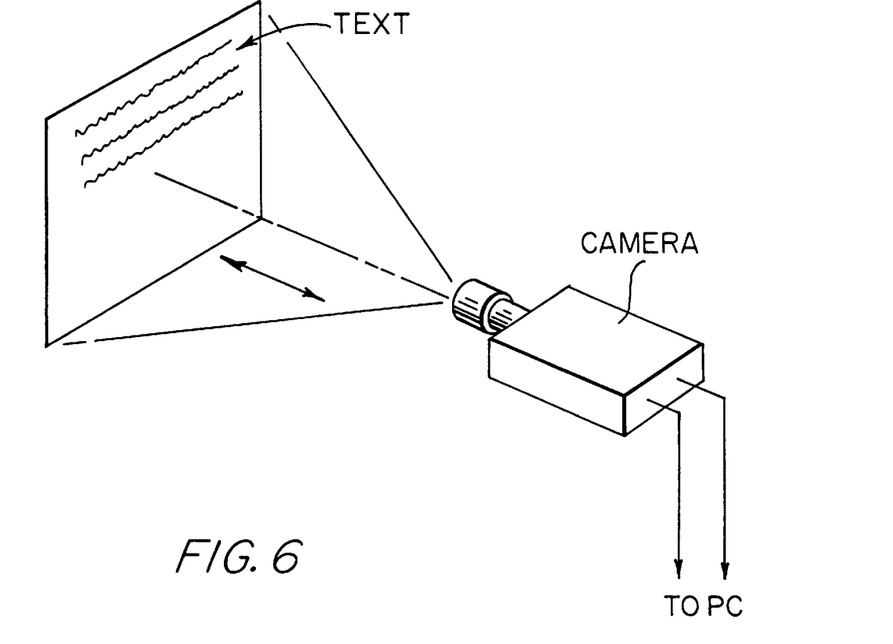
FIG. 6 is a schematic illustration of a camera relative to an image having text.

The representative system used to perform the analyses is shown in FIG. 6. The camera could be a Sony CCD camera XC-77, or a Videk K50004 with a compatible high quality lens (e.g., Nikkor 35 mm f/1.4). The arrangement shown can also include a focus control (not shown). This is a necessary ancillary when maximizing the out-of-focus sample focus position, often a difficult process.

Figure 3A:
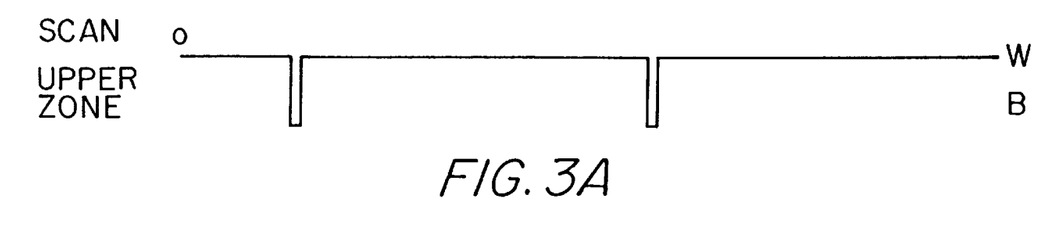
FIGS. 3A–3D indicate zone structure of individual letters in two words given by way of example.
Figure 3B:
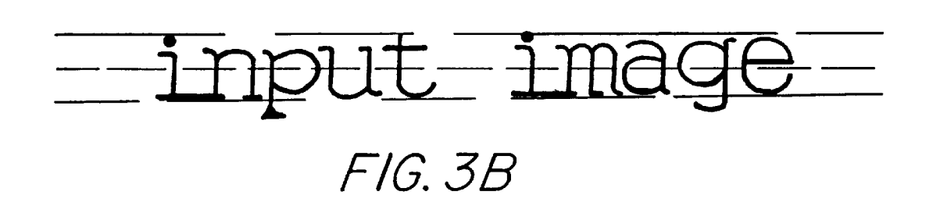
Figure 3C:
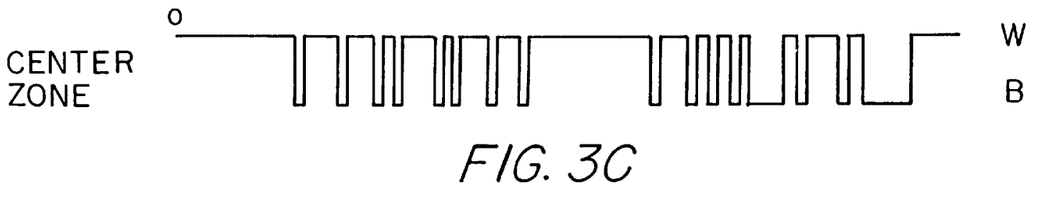
Figure 3D:
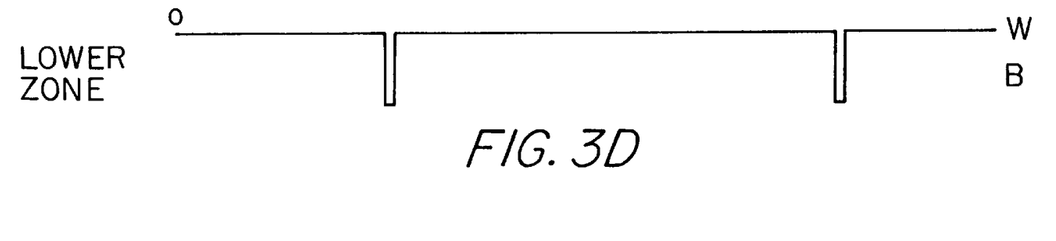

FIG. 3B illustrates the words "input image" enlarged to show a scan through each of the letter zones with the resulting ideal scan results above and below the text (FIGS. 3A, 3C, 3D). The outputs from typewriters and computer printers can be uneven due to either the manual creation or other factors associated with small scale creations. Density ranges and subsequent gray level distributions become the norm. Noise is depicted in text material by the rms value of density:

$$\text{rms} = [S\{p_d \cdot (D - D_m)^2\}]^{1/2}$$

where S represents summation, $P_d$ denotes the probability of occurrence of density level D and $D_m$ is the average density produced by the typewriter, printer, or manufacturing process. Two levels are distinguishable when one exceeds the other as in the ideal scan result of FIGS. 3A, 3C, and 3D. Gray levels in a blurred sample would have to have differences comparable to the same difference criterion if looked at as rms differences. Then the number of distinguishable gray levels might be represented by:

$$N_g = 1 + [(D_x - D_n)/rms]$$
$$= 1 + SNR$$

where SNR is the signal-to-noise ratio and x,n correspond to the maximum, minimum density.

Another function of the setup of FIG. 6 is to determine the focus condition through a measurement of the line spacing of the blurred imagery. After the line scan is completed, the results are assessed. The top (T) and bottom line (B) spacing values are computed from data such as described above and from this, one can determine the orientation of the original (in focus) image when related to the a priori input spacing (s). Typically, this is 4.25 mm. but the origination of the data will be the determinant for this value.

Figure 5:
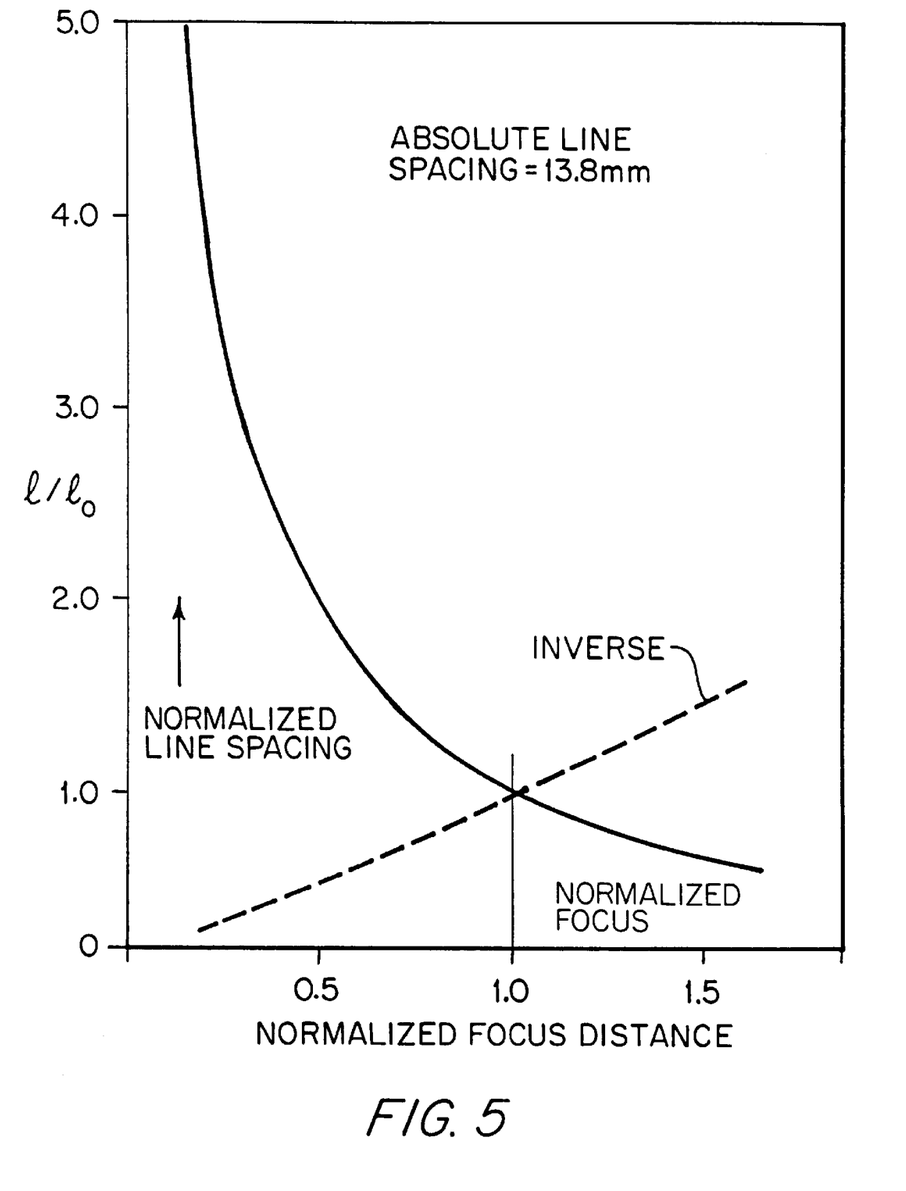
FIG. 5 is a plot relating normalized focused position to a line scan.
Figure 7A:
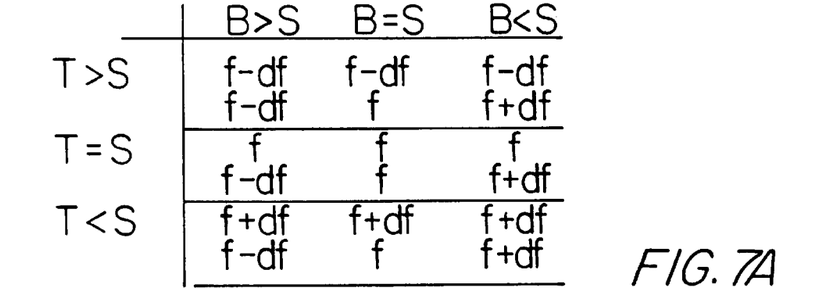
FIG. 7A is a matrix of focal conditions governing the production of a controlled blurred image.
Figure 7B:
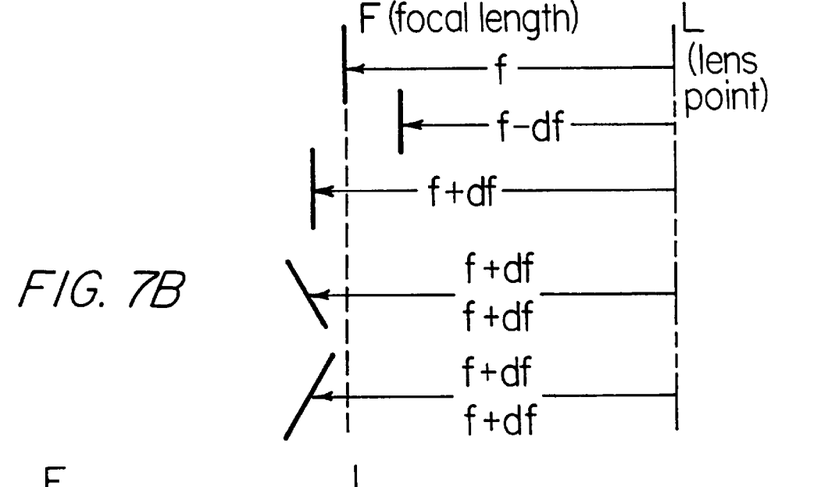
FIG. 7B is a first comparative series of conditions of object position.
Figure 7C:
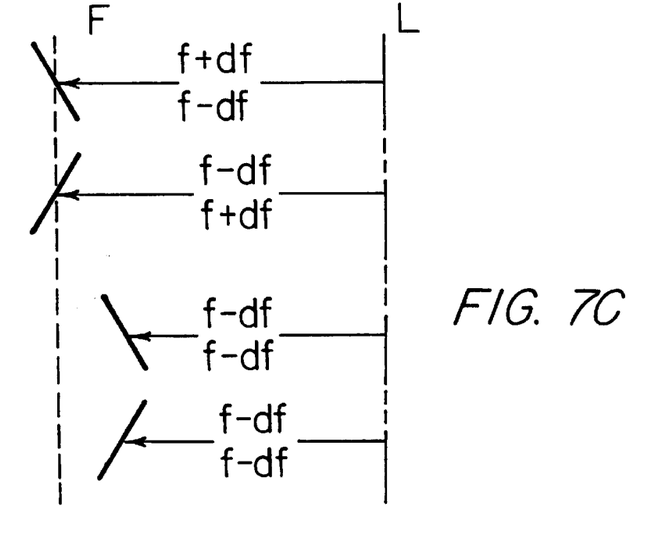
FIG. 7C is a second comparative series of conditions of object position.

The relationship between focus condition and line spacing was described above briefly with reference to deriving the data for FIG. 5 where the image was always normal to the optical axis (no tilt). The matrix shown in FIG. 7A summarizes the results of many non-focus conditions, at least where anomalies occur about the optical axis, at least those shown schematically in FIGS. 7B and 7C. Off-axis conditions are not illustrated but many of them can be accounted for in a similar matrix. Rotational anomalies can be accounted for by line scans where the minimum indicated spacing orients the page correctly.

Figure 8:
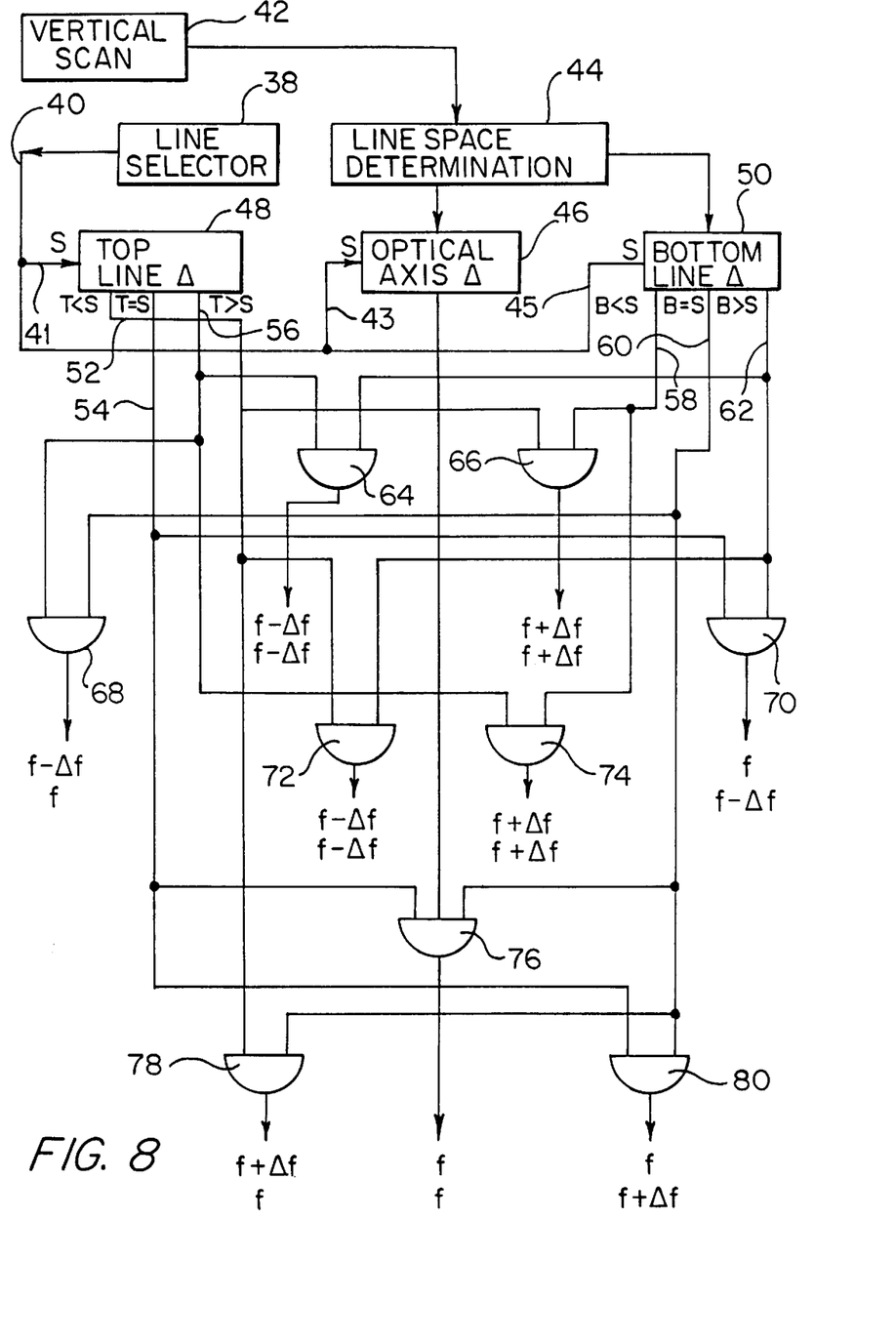
FIG. 8 is a logic diagram of a network for determining the angular orientation of a blurred image relative to an optical axis.

FIG. 8 illustrates a schematic diagram of a logical method to make the appropriate determinations. This figure is identical to FIG. 7 of co-pending application Ser. No. 08/351,707. It also shows the need for having the a priori line spacing, S in the figure. Comparison between the ends of the line scan with each other and with S establishes whether the image was in focus and tilted or not in focus and tilted with the direction determinable. FIG. 8 is connected later to the word scanning and processing.

Figure 9A:
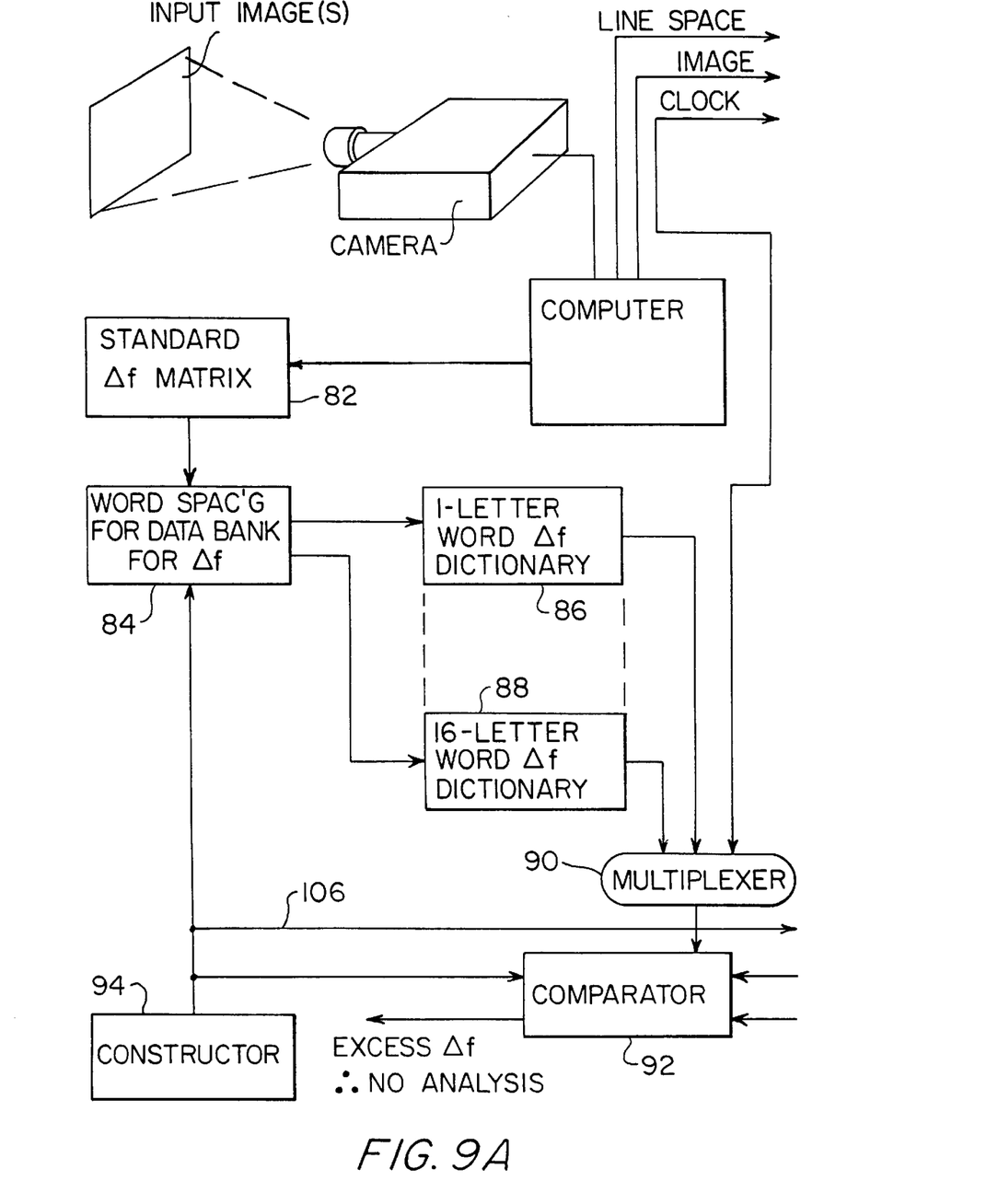
FIGS. 9A and 9B are schematic illustrations of the present invention.
Figure 9B:
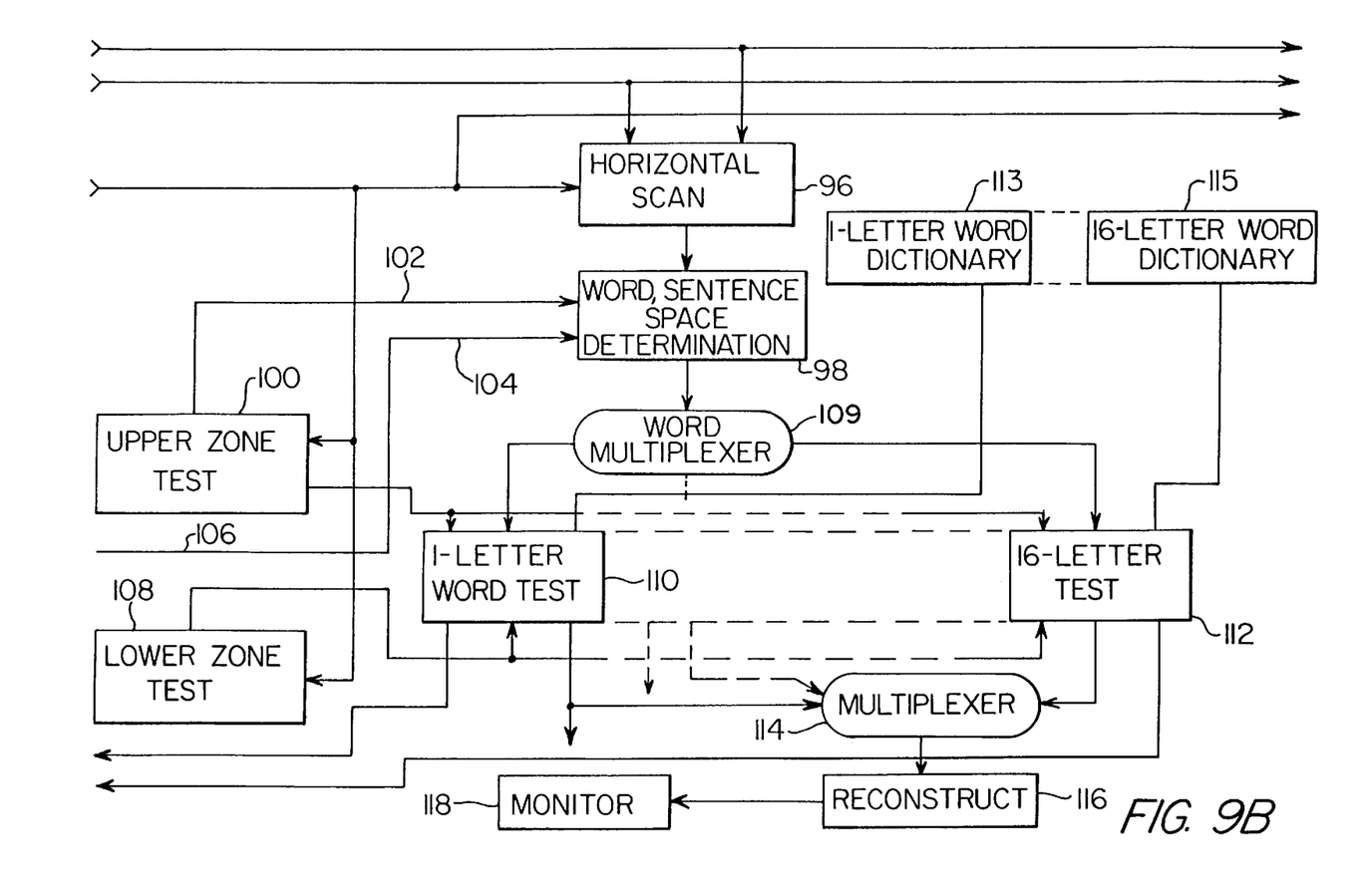

FIGS. 9A and 9B is a schematic illustration of the system for the present invention. The indicated computer has a priori information stored therein, including line spacing and alpha-numeric characteristics. These characteristics may further include the average frequency of occurrence of all letters and the average distribution of word size in textual material in a given language. An input image is subjected to a camera, the output of which is processed by the computer by means of a conventional "frame grabber" (not shown). The digitized image is subjected to a standard focal length matrix 82 and includes the information indicated in FIGS. 7A–7C. The output from the matrix is then used at 84 for determining word spacing for a data band for various focal lengths. Digital dictionaries 86-88 represent words from 1–16 letters at the various focal lengths. Their outputs are provided to a multiplexer 90, which provides a first input to a comparator 92. A second input of the comparator is a constructor block 94 which includes synthesized data corresponding to various unfocused conditions. The comparator 92 has two other primary inputs from FIG. 9B, as will be discussed, and the comparator 92 serves to signal an excess focal length value that would render an analysis invalid.

In FIG. 9B, a horizontal scanning block 96 conducts approximately 90 scans per line of the image undergoing test. The output of the horizontal scans then undergoes determination of word and sentence spacing at 98. Upper and lower character zone tests are conducted at boxes 100 and 108. The results of the upper zone test is provided at 102 to the determination block 98. Additional inputs for the determination are provided at line 104–106 which is an output from the constructor block 94 (FIG. 9A) furnishing synthesized unfocused data. A word multiplexer 109 provides the determination data from 98 to word tests 110–112 which include between 1–16 letter words. The tests 110 and 112 are provided with corresponding letter length dictionaries two of which are indicated by 113 and 115. A multiplexer 114 then samples the various letter word tests 110–112 for reconstruction of the text (116) on a word-by-word basis. The results are presented on a monitor 118.

The a priori inputs of alpha-numeric characteristics, recording parameters, and line spacing are entered so that such elements as the dictionary are compatible (font wise). Line spacing, when entered, is to ensure that appropriate scan lines are used in analysis regardless of the degree of blur. The relationship between normalized focus and scan line separation is obtained for inputted font. Then, when the analysis is complete and used with the matrix of focal conditions of FIG. 7A, the degree of defocus can be used on the words to be brought to the comparator of FIG. 9A. The multiplexer in the same figure follows in sequence the letter size from the wordspace determination (FIG. 9B) and draws from the appropriate dictionary the same coded words which are then compared. The most probable are fed to the reconstruction unit 116 (FIG. 9B). The function of the constructor 94 is to take the output from line scanning and make the decision on the focal condition referred to above. This function differs from the reconstruction unit 116 where the output of the word tests directly from the blurred image is compared with the output of the comparator and the best fit is provided to the monitor. The zone test units of FIG. 9B are keyed to the line scan and clocking units so that the appropriate test is made during the five scans above and below the center zone where 10 scans are made. Once the word sizes are fixed, the location of the u/1 zones is coded.

It should be understood that the invention is not limited to the exact details of construction shown and described herein for obvious modifications will occur to persons skilled in the art.

I claim:

1. A method for restoring a blurred printed document text image comprising the steps:

providing data of parameters for different fonts having varying point sizes;

providing a priori data regarding
(a) printed text structure including average size of words, sentences, and paragraphs for a preselected language;
(b) the average distribution of word size in textural material written in the preselected language;
(c) the average frequency of occurrence of all the letters in textual material written in the preselected language;

establishing predetermined zone characteristics for each letter of an alphabet of the language;

comparing each detected letter of printed text with the zone characteristics for establishing possible letters of words in the blurred text; and determining the text on a word by word basis based on the a priori data and the established possible letters.

2. The method set forth in claim 1 further comprising the step of determining the spacing between lines of text at the top and bottom of a page and comparing the spacing for determining the extent of tilt of the text image, relative to an optical axis during the original recording of the image.

* * * * *